Dec. 27, 1966  M. L. JUROSEK ET AL  3,294,413
INTEGRAL THRUST BEARING AND KINGPIN BUSHING SEAL
Filed Dec. 21, 1964

MAX L. JUROSEK
ROBERT E. SPENCER
INVENTORS

BY John R. Faulkner
   Clifford L. Sadler

ATTORNEYS

United States Patent Office 3,294,413
Patented Dec. 27, 1966

3,294,413
INTEGRAL THRUST BEARING AND
KINGPIN BUSHING SEAL
Max L. Jurosek, Detroit, and Robert E. Spencer, Taylor, Mich., assignors to Ford Motor Company, Dearborn, Mich., a corporation of Delaware
Filed Dec. 21, 1964, Ser. No. 419,696
4 Claims. (Cl. 280—96.1)

The present invention relates generally to front axle constructions for motor vehicles, and more particularly to an integral thrust bearing and kingpin bushing seal assembly for use in connection with such axles.

Front suspension systems for trucks are commonly of the nonindependent type having a solid front axle. A steering knuckle is supported at the outer ends of the axle by a vertically arranged kingpin which provides for steering movement of the knuckle about a generally vertical pivot axis. A wheel spindle is integrally formed with the knuckle for the rotational support of a road wheel.

As stated, the kingpin supports the wheel for steering movement about a generally vertical axis. In order to facilitate this movement, lubricated bushings are provided between the kingpin and the steering knuckle. In addition, a thrust bearing may be provided to support a portion of the sprung mass carried by the axle upon the steering knuckle and the wheel.

For commercial reasons, the manufacturing processes for fabricating the axle and the steering kunckle permit a limited amount of clearance between the axle and the knuckle along the axis of the kingpin. Due to the presence of commercial tolerances, this clearance can become significant. In order to provide satisfactory lubrication for the kingpin bushings and the thrust bearing, it is necessary that the bushings and bearing remain sealed against the entry of contaminants even in the event there is clearance between the axle and the steering knuckle.

In view of the state of the art, it is the principal object of the present invention to provide an integral thrust bearing and kingpin bushing seal assembly that supports the sprung mass of the vehicle, and in addition, seals the end of the kingpin bushing.

More specifically, it is another object of the present invention to provide an improved thrust bearing assembly which cooperates with the steering knuckle and kingpin to seal the kingpin bushing against the entry of contaminants.

It is also an object of the present invention to provide a bearing assembly having an elastomeric case which seals itself against the adjacent surfaces of both the steering knuckle and the axle whereby the thrust bearing and the kingpin bushing are sealed against contamination.

The many objects and advantages of the present invention will become amply apparent upon consideration of the following description and the accompanying drawings, in which.

Figure 1:
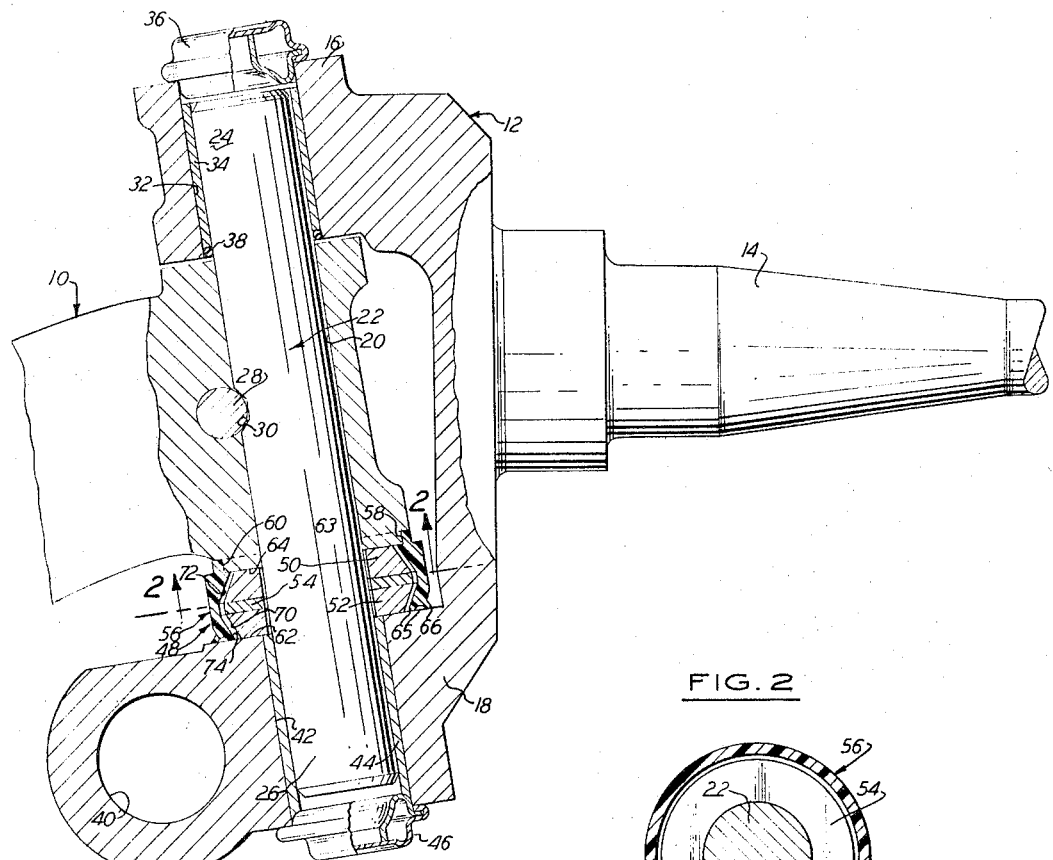
FIGURE 1 is an elevational view partly in section of an axle, a steering knuckle, a kingpin, and a bearing and seal assembly constructed in accordance with the present invention.
Figure 2:
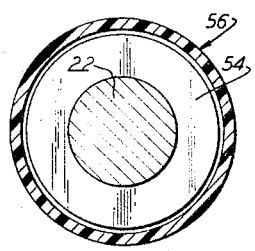
FIGURE 2 is a sectional view taken along section lines 2—2 of FIGURE 1.
Figure 3:
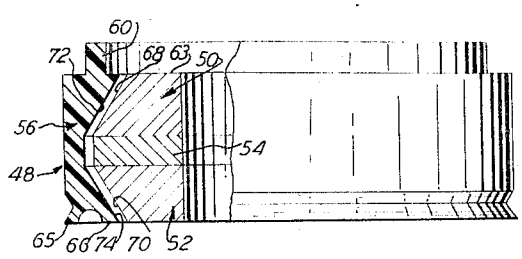
FIGURE 3 is an enlarged view of the bearing and seal assembly of FIGURE 1.

Referring now to the drawings for a comprehensive understanding of the present invention, FIGURE 1 illustrates an axle 10 that is suitable for use in a motor vehicle such as a light truck. A steering knuckle 12 has a spindle portion 14 that is provided to rotatably support a road wheel (not shown). The steering knuckle 12 has a bifurcated inner end construction that comprises upper and lower portions 16 and 18, respectively.

The end of the axle 10 has a substantially vertical bore 20 in which a kingpin 22 is positioned. The kingpin 22 has an upper end 24 and a lower end 26 that extend beyond and protrude from the axle housing 10. A transverse locking pin 28 is positioned within a drilled hole provided in the axle 10 and engages a notch 30 formed in the kingpin 22. Locking pin 28 retains the kingpin 22 against rotary movement as well as axial displacement.

The upper portion 16 of the steering knuckle 12 is provided with a bore 32 that is in axial alignment with the bore 20 of the axle 10. Bore 32 has a greater diameter than has the protruding kingpin portion 24. A bushing of cylindrical configuration is fitted into the space between the bore 32 and the kingpin portion 24. The bushing is identified by the reference numeral 34. A sheet metal cap 36 is forced into the end of the bore 32. The cap 36 retains lubricant within the area of the bushing 34 and prevents the entry of contaminants. An O-ring 38 is positioned at the lower end of the bushing 36 and seals the opening between the bore 32 and the kingpin portion 24. The O-ring 38 prevents the entry of dirt and the escape of lubricant with respect to the bushing 34.

The lower end 18 of the bifurcated portion of the steering knuckle 12 has an opening 40 into which a steering arm may be fitted. The steering arm, which is not shown in the drawing, is connected to the steering linkage that is used to steer the wheel rotatably supported on the spindle 14.

Portion 18 of the steering knuckle 12 has a bore 42 that is greater in diameter than the adjacent portion 26 of the kingpin 22. The bore 42 is in alignment with the kingpin 22 and receives a kingpin bushing 44 which surrounds the portion 26. The bushing 44 is retained by a sheet metal cap 46 which is pressed into the open end of the bore 42. This cap serves to retain the bushing and to prevent the entry of contaminants as well as the escape of lubricant.

An integral thrust bearing and kingpin bushing seal assembly 48 is positioned about the kingpin 22 and is interposed between the end of the axle 10 and portion 18 of the steering knuckle 12. The bearing assembly 48 comprises upper and lower case hardened steel bearing races 50 and 52. A bronze washer-shaped bearing element 54 is interposed between the races 50 and 52. The races 50, 52 and bearing element 54 are retained within a resilient bearing casing 56.

The portion of the axle housing 10 adjacent to the bearing and seal assembly 48 is provided with a circumferential groove 58. The resilient casing 56 has an upstanding lip 60 which is seated in the groove 58. The lip 60 normally has a diameter that is smaller than the diameter of the groove 58 so that it must be stretched to permit engagement. The height of the resilient casing 56 is normally greater when in an unstressed condition than the dimension between the adjacent surfaces 62 and 64 of the steering knuckle 12 and axle 10, respectively. When the casing 56 is put in position, it is compressed into sealed engagement at its lower end with the surface 62 of the knuckle 12. The lower end of the resilient casing 56 is provided with a pair of spaced apart flanges 65 and 66 which form sealing lips that engage the surface 62.

The upper surface 63 of the upper race 50 is in flush contact with the adjacent surface 64 of the axle 10. Because the surface 64 is only roughly machined, no relative movement is intended to occur between the upper bearing race 50 and the axle 10. The same situation exists with respect to the lower bearing race 52. The surface 62 of the steering knuckle 12 is only roughly machined and no relative movement occurs between it and the lower race 52. It should be noted that the edge of the casing 56 adjacent to the races 50 and 52 has a greater diameter than the exposed end surfaces of the races 50 and 52 whereby contact with the surfaces 62 and 64 is not inhibited. When the steering knuckle 12 is pivoted about the kingpin 22 for steering purposes, angular displacement of the surface 62 of the knuckle 12 occurs with respect to the surface 64 of the axle 10. When this occurs, the bearing element 54 slides on the adjacent surfaces of the bearing races 50 and 52.

The edges of the upper and lower steel bearing races 50 and 52 are beveled to form frustro-conical surfaces 68 and 70. The interior of the resilient casing 56 is concave to provide frustro-conical surfaces 72 and 74 which complement the surfaces 68 and 70. This forms an interlocking configuration so that the thrust bearing and seal 48 constitutes a complete assembly that may be installed as a whole rather than in a piecemeal fashion.

The casing 56, due to the fact that it is resiliently deformable, not only serves to retain the bearings 50, 52 and bearing element 54, but it also seals at its ends. This sealing protects the thrust bearing which must support the sprung weight of the vehicle and also protects the kingpin bushing 44.

The resilient case 56 has a greater internal diameter at the surfaces 72 and 74 than the diameter of the frustro-conical portions 68 and 70. This permits the steering knuckle 12 to rotate about a substantially vertical axis through the kingpin 22 without the resilient case interfering with the action of the bearing elements.

The foregoing description constitutes the presently preferred embodiment of this invention. Modifications and alterations may occur to those skilled in the art to come within the scope and spirit of the following claims.

We claim:

1. An axle assembly for a motor vehicle comprising an axle, a bifurcated steering knuckle embracing the end of said axle, said spindle and said axle having aligned bores therethrough, a kingpin extending through said aligned bores and forming a pivotal connection between said spindle and said axle, locking means securing said kingpin to said axle, an integral thrust bearing and kingpin bushing seal assembly interposed between a portion of said steering knuckle and a portion of said axle, said assembly comprising bearing means, said bearing means including a pair of bearing races separated by a bearing element, a one-piece resilient case surrounding said bearing means, said case having an upstanding lip, a portion of said axle having a groove, said lip being seated in said groove, sealing means being formed on a portion of said resilient case and engaging a portion of said steering knuckle, said bearing races having frustro-conical exterior edges, said resilient case having a complementary concave interior configuration adapted to surround said bearing element.

2. An axle assembly for a motor vehicle comprising an axle, a bifurcated steering knuckle embracing the end of said axle, said spindle and said axle having aligned bores therethrough, a kingpin extending through said aligned bores and forming a pivotal connection between said spindle and said axle, an integral thrust bearing and kingpin bushing seal assembly interposed between a portion of said steering knuckle and a portion of said axle, said assembly comprising a bearing means and a one-piece resilient case surrounding said bearing means, said case having an upstanding lip, a portion of said axle having a groove, said lip being seated in said groove, sealing means being formed on a portion of said resilient case and engaging a portion of said steering knuckle, said bearing means having a greater circumference at its midportion than at either of its ends, said resilient case having a complementary concave interior configuration adapted to surround said bearing means whereby said resilient case retains said bearing means therein to form a preassembled bearing and seal unit.

3. An axle assembly for a motor vehicle comprising an axle, a bifurcated steering knuckle embracing the end of said axle, said spindle and said axle having aligned bores therethrough, a kingpin extending through said aligned bores and forming a pivotal connection between said spindle and said axle, locking means securing said kingpin to said axle, an integral thrust bearing and kingpin bushing seal assembly interposed between a portion of said steering knuckle and a portion of said axle, said assembly comprising bearing means, said bearing means including a pair of bearing races separated by a bearing element, a one-piece resilient case surrounding said bearing means, said case having a portion sealed against said axle and a lower portion engaging a portion of said steering knuckle, said bearing races having frustro-conical exterior edges, said resilient case having a complementary concave interior configuration adapted to surround said bearing element.

4. An axle assembly for a motor vehicle comprising an axle, a bifurcated steering knuckle embracing the end of said axle, said spindle and said axle having aligned bores therethrough, a kingpin extending through said aligned bores and forming a pivotal connection between said spindle and said axle, an integral thrust bearing and kingpin bushing seal assembly interposed between a portion of said steering knuckle and a portion of said axle, said assembly comprising a bearing means and a one-piece resilient case surrounding said bearing means, said case having an upstanding portion sealed against said axle and a lower portion engaging a portion of said steering knuckle, said bearing means having a greater circumference at its midportion than at either of its two ends, said resilient case having a complementary concave interior configuration adapted to surround said bearing means whereby said resilient case retains said bearing means therein to form a preassembled bearing and seal unit.

References Cited by the Examiner

UNITED STATES PATENTS

| 1,924,586 | 8/1933 | Zerk | 280—96.1 |
| 2,838,331 | 6/1958 | Coleman | 308—120 X |
| 3,101,961 | 8/1963 | White. | |
| 3,107,949 | 10/1963 | Moskovitz | 308—187.1 X |
| 3,166,333 | 1/1965 | Henley | 287—90 X |

FOREIGN PATENTS 609,891  5/1926  France.

KENNETH H. BETTS, *Primary Examiner.*